Oct. 5, 1954

F. R. BROWN 2,690,769

LAMINATED STRUCTURE

Filed March 29, 1950

INVENTOR.
FRANK R. BROWN

BY

*R. L. Miller*
ATTORNEY

Patented Oct. 5, 1954

2,690,769

UNITED STATES PATENT OFFICE 2,690,769

LAMINATED STRUCTURE

Frank R. Brown, Akron, Ohio, assignor, by mesne assignments, to The Goodyear Tire & Rubber Company, a corporation of Ohio Application March 29, 1950, Serial No. 152,569

4 Claims. (Cl. 138—55)

This invention relates to a laminated structure and the method for manufacturing the same.

More particularly, it relates to a laminated structure of a thermoplastic material and a rubber material.

Thermoplastic materials generally possess certain highly advantageous chemical and physico-chemical characteristics which render them adaptable to many uses for which certain materials such, for example, as rubber and rubber-like compounds are unsuited. By the same token, most rubber compounds possess, when vulcanized, such favorable attributes as flexibility, resistance to abrasion, insulating properties and the like. It is therefore desirable to combine the advantageous properties of both materials in a single product, but this goal has not heretofore been successfully achieved due to certain difficulties encountered in combining the materials.

Many thermoplastic materials are substantially chemically inert so that they have the ability to withstand contact with certain chemicals and acids without being adversely affected whereas many of the rubber compounds or other materials are materially affected so that they are not suitable for such uses. The fact that these thermoplastic materials will successfully withstand contact with these various chemicals and acids makes them very suitable for use where such conditions are encountered, particularly if they can be combined satisfactorily with rubber to form a laminated structure. Due to their chemical inertness, many of these thermoplastic materials are very difficult, if not impossible, to satisfactorily adhere to rubber by any of the conventional practices and, consequently, in the past it has not been possible to satisfactorily manufacture such products.

Because an all-thermoplastic construction will stiffen when exposed to cold and soften when exposed to heat, it is not satisfactory in many instances to use this type of construction. By properly laminating thermoplastic material with a rubber material, the product obtained has many of the advantages of both types of material.

It is an object of the present invention to provide a new product that may be used for handling chemicals or acids.

Another object is to provide a laminated structure of materials that previously have not been satisfactorily laminated.

A still further object of this invention is to provide a novel method by which satisfactory adhesions may be obtained between thermoplastic materials and rubber materials.

Another object of this invention is to provide a relatively inexpensive and simple method of manufacturing a laminated product of this type.

A still further object is to provide a method of manufacturing a new type of laminated product requiring a minimum of change in the present production practices.

Other objects and advantages of the invention will appear hereinafter as the description proceeds, the novel features, arrangements and combinations being clearly pointed out in the specification and in the appended claims.

This invention overcomes the aforementioned difficulties by providing a means for obtaining satisfactory adhesion between the thermoplastic material and the rubber. The portion of the structure that is to be in contact with the chemical or acid is formed of the thermoplastic material which in turn is laminated to the remainder of the structure, the rubber material and a reenforcement layer. The reenforcement layer is located between the thermoplastic material and the rubber and functions not only to prevent excessive dimensional changes and increase the strength of the structure but also to assist in forming a satisfactory adhesion or bond between the elements of the laminate. The laminated structures are plied up in the usual manner, using unvulcanized rubber, and then subjected to heat and pressure which vulcanizes the rubber and causes portions of the thermoplastic material to flow through the interstices of the reenforcement material and form protuberances around which the rubber is formed and vulcanized. The protuberances may be of a mushroom-like shape which assists in providing a mechanical type of interlock with the rubber layer to give a highly satisfactory adhesion.

By way of illustration, the teaching of the present invention will be described in detail with respect to its application to certain typical forms of laminates embodying at least one ply of polyethylene, a reenforcing ply and one or more plies of a rubber material. It is not intended, however, that the inventive concept of the present application be restricted solely to the products or the specific materials hereinafter described by virtue of the fact that the invention may be advantageously employed in other ways.

Figure 1:
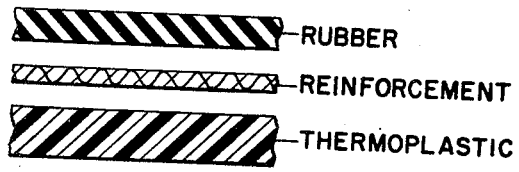
Fig. 1 is a sectional view showing the arrangement of the several laminae of a laminated structure in exploded relation preparatory to the final step in the fabrication thereof.

A laminated structure is plied up as shown in Fig. 1 of a layer of thermoplastic material, such as polyethylene, a reenforcement layer having interstices therein, and a layer of unvulcanized rubber material. It is to be understood that the term "rubber" is meant to include any natural, synthetic or reclaimed rubber as well as any materials having rubber-like properties. The reenforcement layer may be of any suitable material such as a textile material with an open weave, screening material, or a braid of textile cord, wire, or other similar material.

Figure 2:
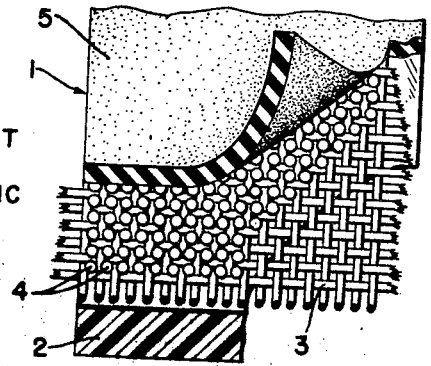
Fig. 2 is a perspective view of a completed structure of the type illustrated in Fig. 1 embodying the teaching of the present invention.

The assembly 1 is then subjected to heat and pressure, for example, by a platen press although any means may be used for this purpose, which causes portions of the polyethylene layer 2 as shown in Fig. 2 to be forced through the interstices of the reenforcement layer 3 and form mushroom-like protuberances 4. The rubber layer 5, being formed and vulcanized around the protuberances 4, locks the elements of the structure together. In Fig. 2, a portion of the rubber layer is peeled back to illustrate the manner in which portions of the polyethylene layer 2 have been forced through the interstices of the reenforcement layer 3 to form the protuberances 4.

Figure 3:
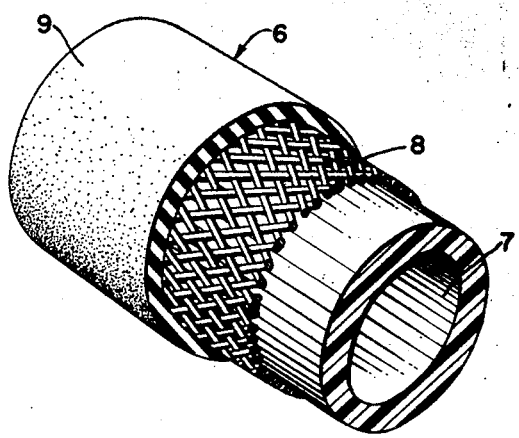
Fig. 3 is a perspective view showing a hose construction embodying a plurality of plies of material in assembled relation in advance of the completion of the product.
Figure 5:
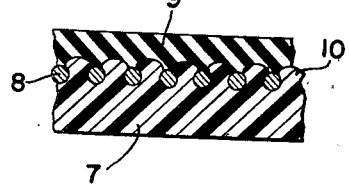
Fig. 5 is a section of the hose structure taken along the line 5—5 in Fig. 4.
Figure 4:
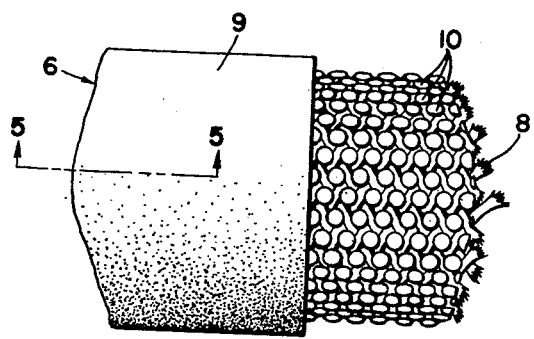
Fig. 4 is a plan view of a hose structure of the type illustrated in Fig. 3 upon completion.

A specific product to which this invention may be applied is illustrated in Figs. 3, 4 and 5. A hose 6 is formed in the usual manner with a polyethylene tube 7 over which is braided a textile reenforcement layer 8. A rubber cover 9 is extruded over this and then the hose is subjected to heat and pressure in the usual manner, for example sheathing or jacketing the hose in lead and then applying air pressure to the interior of the hose while subjecting the exterior sheath or jacket to heat. This causes portions of the polyethylene to flow through the interstices of the braid 8 to form the protuberances 10. The rubber cover is formed and vulcanized about the protuberances 10, which mechanically interlocks the structures together. To illustrate the manner in which a portion of the polyethylene tube 7 is forced through the braid 8, a portion of the rubber cover 9 is stripped off in Fig. 4 while Fig. 5 illustrates the general shape of the protuberances formed by the aforementioned method.

The hose as illustrated in Figs. 3, 4 and 5 may be constructed with the layer of rubber 9 used as the inner tube while the polyethylene layer 7 is used as a cover for the hose. The arrangement of the thermoplastic material and the rubber is determined by the particular conditions that are encountered in use.

From the preceding description it will readily be seen that no special equipment is needed to practice the invention. The usual apparatus and equipment used to produce similar products is suitable for use with this invention but produces a new article that meets a need that heretofore had been impossible to fulfill.

While certain representative embodiments and details have been shown for the purpose of illustrating the invention, it will be apparent to those skilled in the art that various changes and modifications may be made therein without departing from the spirit or scope of the invention.

I claim:

1. A composite structure comprising a layer of reenforcement material having interstices therein, a layer of rubber on one side of said reenforcement material and a layer of polyethylene on the other side of said reenforcement layer, said polyethylene layer having mushroom-like protuberances extending through the interstices of said reenforcement layer, and said rubber layer surrounding said protuberances whereby the elements of the structure are mechanically interlocked.

2. A composite structure comprising a braided textile reenforcement layer having interstices therein, a layer of rubber on one side of said braided textile reenforcement layer and a layer of polyethylene on the other side of said braided textile reenforcement layer, said polyethylene layer having mushroom-like protuberances extending through the interstices of said reenforcement layer, and said rubber layer surrounding said protuberances whereby the elements of the said structure are mechanically interlocked.

3. A fluid-conducting hose comprising an inner layer of polyethylene, an intermediate layer of braided reenforcement material having interstices therein, and an outer cover of rubber, said inner layer having protuberances extending through the interstices of said braided reenforcement layer into said rubber layer, and said rubber layer surrounding said protuberances.

4. A fluid-conducting hose comprising at least an inner layer of polyethylene, an intermediate layer of reenforcement material having interstices therein, and an outer cover of rubber, said inner layer having protuberances extending through the interstices of said reenforcement layer, and said rubber layer surrounding said protuberances.

References Cited in the file of this patent

UNITED STATES PATENTS

| Number | Name | Date |
| --- | --- | --- |
| 1,152,836 | Price | Sept. 7, 1915 |
| 1,948,410 | Williamson | Feb. 20, 1934 |
| 2,071,921 | Dickson | Feb. 23, 1937 |
| 2,226,768 | Harrison | Dec. 31, 1940 |
| 2,416,061 | McAlevy et al. | Feb. 18, 1947 |
| 2,436,421 | Cork | Feb. 24, 1948 |
| 2,514,429 | Waugh | July 11, 1950 |
| 2,526,311 | Willson | Oct. 17, 1950 |
| 2,564,602 | Hurst | Aug. 14, 1951 |